United States Patent
Weber

(10) Patent No.: US 7,480,385 B2
(45) Date of Patent: Jan. 20, 2009

(54) HIERARCHICAL ENCRYPTION KEY SYSTEM FOR SECURING DIGITAL MEDIA

(75) Inventor: Joseph W. Weber, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 846 days.

(21) Appl. No.: 10/982,994

(22) Filed: Nov. 5, 2004

(65) Prior Publication Data

US 2006/0101524 A1       May 11, 2006

(51) Int. Cl.
    *H04L 9/16*       (2006.01)
(52) U.S. Cl. ............................ 380/277; 380/45; 726/27
(58) Field of Classification Search .................... 726/27
    See application file for complete search history.

(56) References Cited

U.S. PATENT DOCUMENTS

| | | | |
|---|---|---|---|
| 6,069,957 A * | 5/2000 | Richards | 380/281 |
| 2003/0002668 A1 * | 1/2003 | Graunke et al. | 380/45 |
| 2003/0078795 A1 * | 4/2003 | Collier | 705/1 |

* cited by examiner

*Primary Examiner*—Matthew B Smithers
(74) *Attorney, Agent, or Firm*—Patton Boggs LLP

(57) ABSTRACT

The hierarchical encryption key system uses multiple encryption processes for encrypting digital media content in a manner that supports both broadcast and delayed or time-shifted modes of content delivery. The hierarchical encryption key system uses a hierarchical series of encryption keys wherein each subsequent key in the hierarchy encrypts successively increasing time periods of the content that is transmitted from the Cable Modem Termination System to the consumer device. In addition, at one of the layers, the keys are aggregated into a collection or table of keys. The aggregation of keys facilitates the playback of recorded digital content (as opposed to broadcast or streaming digital content) by aggregating keys required for the duration of the content separately. The different layers are linked in a manner to make it difficult to use a brute force attack in an attempt to determine the keys.

16 Claims, 4 Drawing Sheets

| Layer | Description | Keys | Key Lifetime |
|---|---|---|---|
| Master | The Master Key is valid for the entire duration of the content. The Master Key is used to encrypt the entire set of Sections Keys. | Master | Duration of the Program |
| Section | A set of Sections Keys is associated with the entire program time period, typically minute or hours. These Keys are scrambled by the MasterKey. The scrambled Section Keys are stored separately from the content. | Section (many) | Minutes to Hours |
| Content | The digital content itself is scrambled with Content Keys which change often, on the order of seconds to minutes. These keys are scrambled by the Section Keys. The scrambled Content Keys are sent along with the content. | Content (many) | Seconds to Minutes |

*FIG. 2*

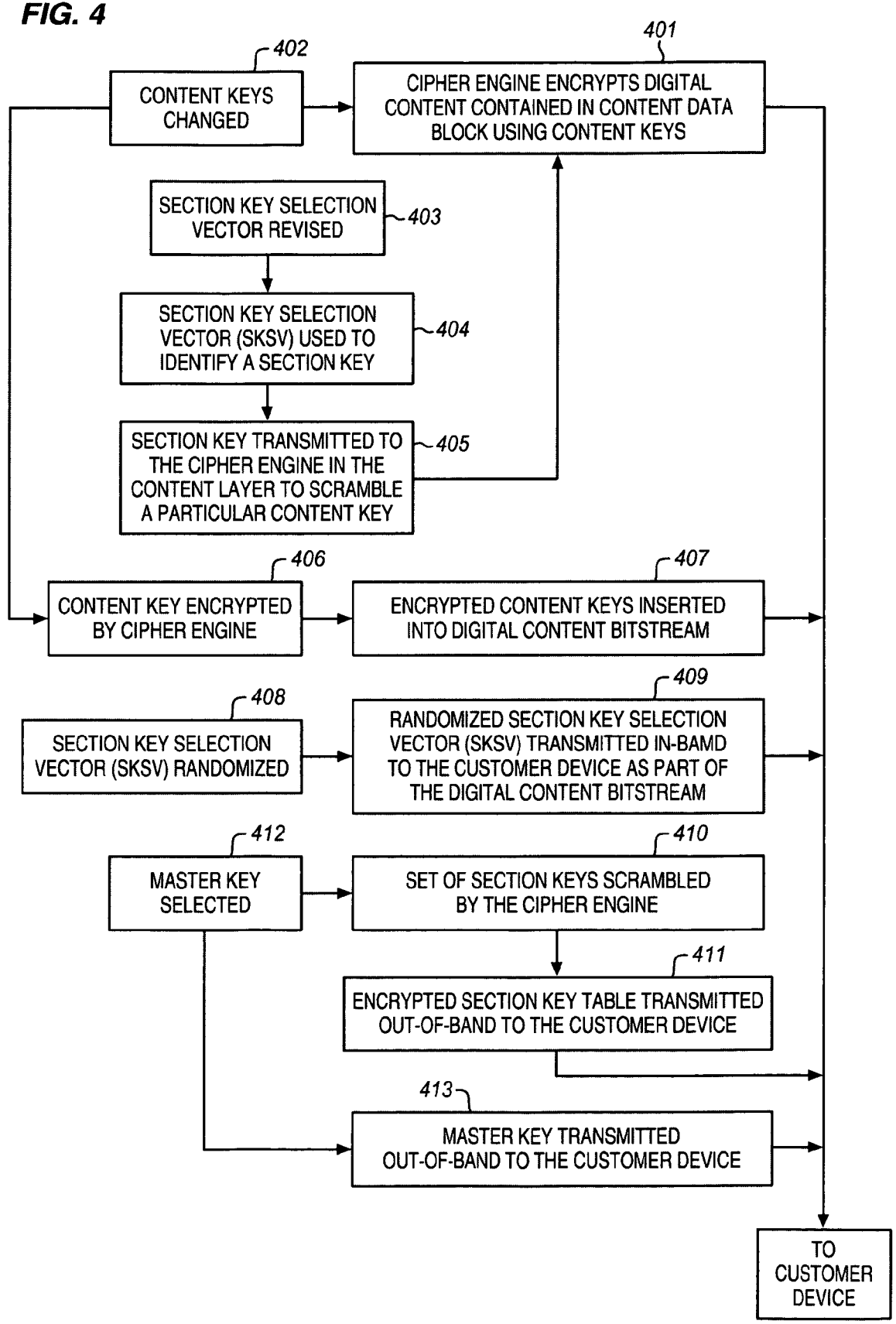

HIERARCHICAL ENCRYPTION KEY SYSTEM FOR SECURING DIGITAL MEDIA

FIELD OF THE INVENTION

This invention relates to cable and satellite content distribution networks and, in particular, to a data encryption protocol that uses multiple encryption processes for encrypting digital media content in a manner that supports both broadcast and delayed or time-shifted modes of content delivery.

PROBLEM

It is a problem in existing cable and satellite content distribution networks to encrypt digital media content in a manner that supports both broadcast and delayed or time-shifted modes of content delivery. It is a further problem to provide a secure process for delivering content to authenticated devices on cable and satellite content distribution networks.

Existing conditional access systems of cable and satellite content distribution networks broadcast all security information to all devices on the network. They use a one-way communication protocol transmitted from security system servers in the cable network to data decryption devices that are located in the home. These one-way communication protocol systems use Entitlement Management Messages and Entitlement Control Messages (EMM and ECM) that are broadcast to all devices on the network. This potentially creates security problems, since these messages are not transmitted to a single target device. In addition, the Entitlement Control Messages are transmitted in-band with the content while the Entitlement Management Messages are transmitted separately from the content.

As an example of existing conditional access systems, the OpenCable system uses a removable security device located in the home and the MHP Common Interface specification uses a removable hardware approach to protecting MPEG content. Content is passed from the cable network to a separate removable component located in the home, which component performs the decryption of the scrambled content.

However, these existing cable and satellite content distribution networks use a single layer of encryption keys to scramble content for both broadcast and delayed or time-shifted modes of content delivery. With a single layer of encryption keys, it is more difficult to support both modes of content delivery. In addition, the use of a single layer of encryption keys renders this architecture susceptible to hacking, since the level of security provided by a single layer of encryption is minimal.

Solution

The above-described problems are solved and a technical advance achieved by the present Hierarchical Encryption Key System For Securing Digital Media (termed "hierarchical encryption key system" herein) which uses multiple encryption processes for encrypting digital media content in a manner that supports both broadcast and delayed or time-shifted modes of content delivery.

The present hierarchical encryption key system uses a hierarchical series of encryption keys wherein each subsequent key in the hierarchy encrypts successively increasing time periods of the content that is transmitted from the cable and satellite content distribution network to the consumer device. In addition, some of the encryption keys are transmitted in-band while others are transmitted out-of-band to the consumer device to thereby thwart hacking attempts. Furthermore, at one of the layers, the keys are aggregated into a collection or table of keys. The aggregation of keys facilitates the playback of recorded digital content (as opposed to broadcast or streaming digital content) by aggregating keys required for the duration of the content separately. The different layers are also linked in a manner to make it difficult to use a brute force attack in an attempt to determine the keys.

The present hierarchical encryption key system replaces the existing Entitlement Control Messages with encrypted content keys and associated section information while the Entitlement Management Messages are replaced with out-of-band messages that contain Master and Section Keys. The exact relationship between Entitlement Control Messages and Entitlement Management Messages is proprietary and maintained as a secret for security purposes.

This hierarchical encryption key system provides a way of encrypting digital media content in a manner that supports both broadcast and delayed or time-shifted modes of content delivery. In a broadcast mode, the content is decrypted as soon as it is received and displayed. In a delayed mode, the content is received and stored locally before later being decrypted. The present hierarchical encryption key system separates encryption keys at different layers so that the delayed content can be securely stored in a local storage unit. With just a single layer of encryption keys, it is more difficult to support both modes. Either each of the many content keys used over the duration of the program is stored separately or only a few keys are used. Using fewer keys leads to weaker protection because keys do not change as often.

There is a balance of two opposing needs: changing content keys frequently for stronger security and the need to keep keys associated with the content separate when storing the content and accessing it in a non-broadcast fashion. The linking of the two different tiers, the content and the section tiers, in the present hierarchical encryption key system balances the two needs and supports both of them.

BRIEF DESCRIPTION OF THE DRAWINGS

FIG. 2 illustrates in table form the characteristics of the various layers of a typical embodiment of the present hierarchical encryption key system;

FIG. 4 illustrates in flow diagram form the operation of the present hierarchical encryption key system.

DETAILED DESCRIPTION

System Environment

A Cable Modem Termination System (CMTS) is a system of devices that allows cable television operators to offer high-speed Internet access to home computers. The Cable Modem Termination System sends and receives digital cable modem signals on a cable network, receiving signals sent upstream from a subscriber's cable modem, converting the signals to IP packets, and routing the signals on to an Internet Service Provider (ISP) for connection to the Internet. The Cable Modem Termination System also sends signals downstream from the Internet to the user's cable modem. Cable modems cannot communicate directly with each other; they must communicate by channeling their signals through the Cable Modem Termination System.

DOCSIS (Data Over Cable Service Interface Specification) is a standard interface for cable modems, the devices that handle incoming and outgoing data signals between the cable operator and a subscriber's personal or business computer or television set. DOCSIS specifies modulation schemes and the protocol for exchanging the bi-directional signals over cable. In other words, DOCSIS is the protocol used for sending and receiving signals between the subscriber cable modem and the CMTS where the signals are converted to/from DOCSIS from/to IP packets.

Architecture of the Hierarchical Encryption Key System

Figure 1:
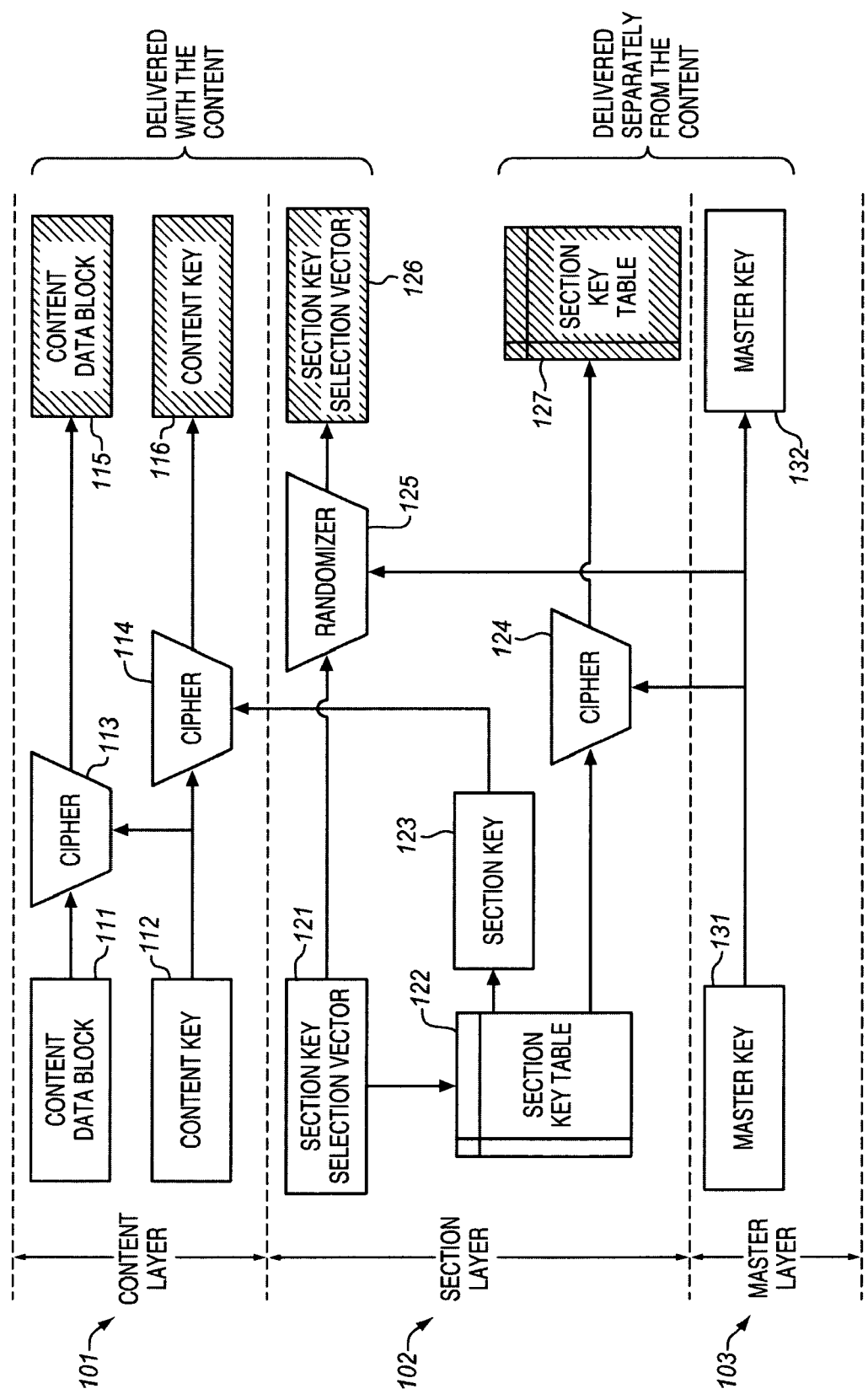
FIG. 1 illustrates in block diagram form the encryption of content and keys in a typical embodiment of the present hierarchical encryption key system.

FIG. 1 illustrates in block diagram form the encryption of content and keys in a typical embodiment of the present hierarchical encryption key system, and FIG. 2 illustrates in table form the characteristics of the various layers of a typical embodiment of the present hierarchical encryption key system.

The hierarchical encryption key system 100 uses a plurality of layers to provide the content encryption function: Content Layer 101, Section Layer 102, and Master Layer 103. Each of these layers implements a portion of the overall content encryption process, with some of the encryption keys being transmitted in-band with the encrypted content and other keys being transmitted out-of-band to thereby provide additional security for the encrypted content. The use of a hierarchy of encryption keys also supports both broadcast and delayed or time-shifted modes of content delivery. In a broadcast mode, the content is decrypted as soon as it is received and displayed. In a delayed mode, the content is received and stored locally before later being decrypted. Since the present hierarchical encryption key system separates encryption keys at different layers, the delayed content can be securely stored in a local storage unit.

FIG. 4 illustrates in flow diagram form the operation of the present hierarchical encryption key system 100 as illustrated in FIG. 1. The processes described herein are concurrently operational and the sequences described herein are not the only implementation envisioned, since multiple concurrently operating processes can be managed in a multitude of ways to implement the concepts described herein. Therefore, the present implementation is not intended to limit the concepts taught herein, but simply represents one method of the many ways of providing the functionality described herein.

At the lowest layer, the Content Layer 101, the digital content contained in a content data block 111 is encrypted by a cipher engine 113 at step 401 using Content Keys which are stored in content key memory 112, which content keys are changed frequently at step 402, on the order of seconds or minutes of the presentation time of the content. Each cipher engine illustrated in FIG. 1 represents a digital cipher process, which may or may not differ from each other. The content key used by cipher engine 113 to encrypt content data block 111 is itself encrypted by cipher engine 114 at step 406 and the encrypted content keys are inserted into the digital content bitstream at step 407. The digital content bitstream comprises a combination of the encrypted content shown as content data block 115, an associated encrypted content key 116, and a randomized section key selection vector 126 (as described herein).

The next layer of the hierarchical encryption key system 100 is the Section Layer 102 where a single Section Key is selected for use to scramble multiple content keys in the Content Layer 101. The duration over which the Section Keys are in effect is longer than the Content Keys, since typically a set of Section Keys is used to encrypt the entire duration of the content and at step 403 the Section Key Selection Vector 121 is periodically revised. The Section Layer 102 consists of a section key table 122 which contains a plurality of section keys for use in encrypting digital content. The section key selection vector (SKSV) 121 is used to identify a Section Key 123 at step 404, which is transmitted to the cipher engine 114 in the Content Layer 101 at step 405 where the section key is used to scramble a particular content key 112. In addition, the section key selection vector (SKSV) 121 is processed at step 408 by randomizer 125 (as described below) to make it more difficult to crack the encrypted content key 116. The randomized section key selection vector (SKSV) 126 is transmitted in-band at step 409 to the customer device as part of the digital content bitstream.

In contrast, the set of Section Keys contained in section key table 122 is scrambled by the cipher engine 124 at step 410 using the Master Key 131 to create an encrypted section key table 127 which are transmitted out-of-band at step 411 to the customer device. The encrypted set of Section Keys 127 is kept separate from the digital content bitstream to enable faster access to the section keys by the customer device.

At the next layer, the Master Layer 103, the Master Key 131 is in effect for the entire duration of the content and is selected at step 412. The Master Key 131 as noted above is used by encryption engine 124 to encrypt the entire set of Section Keys that are stored in section key table 122. A single Master Key 132 is transmitted out-of-band to the customer device at step 413.

Randomizer

As noted above, the section key selection vector (SKSV) 121 is randomized to make it more difficult to crack the encrypted Content Key 116. Multiple Content Keys 112 are encrypted with a single Section Key 123. For all of those Content Keys 112, the section key selection vector (SKSV) 121 is the same. If the section key selection vector (SKSV) 121 is not randomized, then someone attempting to hack the encrypted Content Data knows which sections of the content are encrypted with the same Content Key 112, making it easier for the hacker. A randomized section key selection vector (SKSV) 121 makes the pattern detection more difficult.

Figure 3:
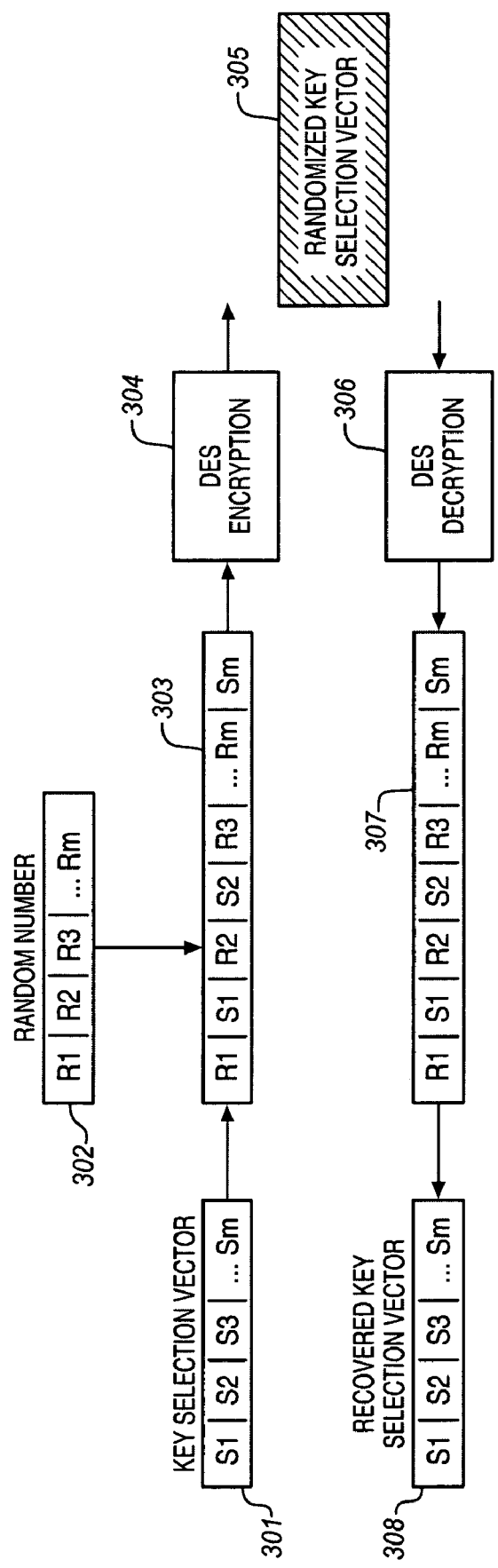
FIG. 3 illustrates an example of a randomizer used in the present hierarchical encryption key system.

FIG. 3 illustrates an example of a randomizer used in the present hierarchical encryption key system 100. An example of a randomizer is to take the m-bit section key selection vector (SKSV) 301 (bits S1-Sm) and insert a random bit (R1-Rm) from a random number 302 between each bit of the m-bit section key selection vector (SKSV) 301 to create a 2m-bit value 303 which comprises the interleaved bits of the m-bit section key selection vector (SKSV) 301 (bits S1-Sm) and the random bits (R1-Rm) from a random number 302. This 2m-bit value 303 is then encrypted by an encryption engine 304, such as DES encryption, to create an encrypted randomized key selection vector 305, which is transmitted to the customer device. When the resultant encrypted randomized key selection vector 305 is decrypted by a decryption engine 306 in the customer device, the 2m-bit value 307 which comprises the interleaved bits of the m-bit section key selection vector (SKSV) 301 (bits S1-Sm) and the random bits (R1-Rm) from a random number 302, the random bits (R1-Rm) of random number 302 are retrieved. This value is identical to the originally generated 2m-bit value 303 which comprises the interleaved bits of the m-bit section key selection vector (SKSV) 301 (bits S1-Sm) and the random bits (R1-Rm) from a random number 302. The customer device then simply removes the random bits (R1-Rm) to recover the original m-bit section key selection vector (SKSV) 308.

Any cipher process can be used in the randomizer, not just DES. DES, however, sufficiently scrambles the section key selection vector (SKSV) 121 and random bits such that each encrypted section key selection vector (SKSV) 121 appears random even if the original section key selection vector (SKSV) 121 does not change.

Characteristics of the Hierarchical Encryption Key System Layers

FIG. 2 illustrates in table form the characteristics of the various layers of a typical embodiment of the present hierarchical encryption key system 100. The Content 101 and Section 102 Layers are defined to support broadcast content and recorded content. Content can be encrypted in real time for broadcast or encrypted off-line and recorded for later delivery. The combination of Master 103 and Section 102 Layers facilitates the recording of content as well as secure transfer of content to removable media. This combination also facilitates DVR and removable media recording by separating the Session Keys for a particular program which can then be stored separately from the content. This also allows a download of protected content to a storage unit, but without the keys necessary to decrypt the content. The scrambled content would be stored securely until the Section 102 and Master 103 Key information is delivered to the customer device at a later time.

SUMMARY

The hierarchical encryption key system uses multiple encryption processes for encrypting digital media content in a manner that supports both broadcast and delayed or time-shifted modes of content delivery.

What is claimed:

1. A system for encrypting digital media content that is transmitted from a content distribution network to a consumer device connected to the content distribution network comprising:
    means for generating a hierarchical series of encryption keys;
    means for encrypting said digital media content using a content key;
    means for periodically changing said content key;
    means for encrypting said content key;
    means for storing a plurality of section keys;
    means for selecting a sequence of section keys to be used for encrypting said content key in an order defined by said sequence;
    means for randomizing said sequence of section keys;
    means for transmitting a section key selected by said sequence to said means for encrypting said content key; and
    means for transmitting said encrypted digital media content, said encrypted content key and to said consumer device.

2. The system for encrypting digital media content of claim 1 further comprising:
    means for transmitting at least one of said hierarchical series of encryption keys in-band to said consumer device; and
    means for transmitting at least one of said hierarchical series of keys out-of-band to said consumer device.

3. The system for encrypting digital media content of claim 1 further comprising:
    means for encrypting at least one of said hierarchical series of encryption keys with another of said hierarchical series of encryption keys prior to transmission to said consumer device.

4. The system for encrypting digital media content of claim 1 further comprising:
    means for aggregating a plurality of said hierarchical series of encryption keys into a table of encryption keys prior to transmission to said consumer device.

5. The system for encrypting digital media content of claim 1 further comprising:
    means for aggregating said encrypted digital media content, said encrypted content key, and said randomized sequence of section keys for transmission in-band to said consumer device.

6. The system for encrypting digital media content of claim 1 further comprising:
    means for generating a master key; and
    means for transmitting said master key to said means for encrypting said section key.

7. The system for encrypting digital media content of claim 6 further comprising:
    means for transmitting said master key out-of-band to said consumer device.

8. The system for encrypting digital media content of claim 6 further comprising:
    means for aggregating said encrypted section key and said master key for transmission out-of-band to said consumer device.

9. A method for encrypting digital media content that is transmitted from a content distribution network to a consumer device connected to the content distribution network, comprising:
    generating a hierarchical series of encryption keys;
    encrypting said digital media content using a content key;
    periodically changing said content keys;
    encrypting said content key;
    storing a plurality of section keys;
    selecting a sequence of section keys to be used for encrypting said content key in an order defined by said sequence;
    randomizing said sequence of section keys;
    transmitting a section key selected by said sequence to said means for encrypting said content key; and
    transmitting said encrypted digital media content, said encrypted content key and to said consumer device.

10. The method for encrypting digital media content of claim 9 further comprising:
    transmitting at least one of said hierarchical series of encryption keys in-band to said consumer device; and
    transmitting at least one of said hierarchical series of encryption keys out-of-band to said consumer device.

11. The method for encrypting digital media content of claim 9 further comprising:
    encrypting at least one of said hierarchical series of encryption keys with another of said hierarchical series of encryption keys prior to transmission to said consumer device.

12. The method for encrypting digital media content of claim 9 further comprising:
    aggregating a plurality of said hierarchical series of encryption keys into a table of encryption keys prior to transmission to said consumer device.

13. The method for encrypting digital media content of claim 9 further comprising:

aggregating said encrypted digital media content, said encrypted content key, and said randomized sequence of section keys for transmission in-band to said consumer device.

14. The method for encrypting digital media content of claim 9 further comprising:

generating a master key; and transmitting said master key to said step of encrypting said section key.

15. The method for encrypting digital media content of claim 14 further comprising:

transmitting said master key out-of-band to said consumer device.

16. The method for encrypting digital media content of claim 14 further comprising:

aggregating said encrypted section key and said master key for transmission out-of-band to said consumer device.

* * * * *